United States Patent
Nelson

(10) Patent No.: US 10,910,937 B2
(45) Date of Patent: Feb. 2, 2021

(54) CONTROL CIRCUIT SYNCHRONIZATION OF WELDING-TYPE POWER SUPPLIES

(71) Applicant: ILLINOIS TOOL WORKS INC., Glenview, IL (US)

(72) Inventor: Andrew D. Nelson, Appleton, WI (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 350 days.

(21) Appl. No.: 15/992,657

(22) Filed: May 30, 2018

(65) Prior Publication Data

US 2019/0372451 A1 Dec. 5, 2019

(51) Int. Cl.
| | | |
|---|---|---|
| *H02M 1/08* | (2006.01) | |
| *B23K 9/10* | (2006.01) | |
| *H02M 3/156* | (2006.01) | |
| *H02M 5/458* | (2006.01) | |
| *H02M 7/06* | (2006.01) | |

(52) U.S. Cl.
CPC ............ *H02M 1/08* (2013.01); *B23K 9/1043* (2013.01); *H02M 3/156* (2013.01); *H02M 5/458* (2013.01); *H02M 7/06* (2013.01)

(58) Field of Classification Search
CPC ...... B23K 9/1043; B23K 9/10; B23K 9/0953; B23K 9/1062; B23K 9/095; B23K 13/08; B23K 10/02; B23K 10/00; B23K 10/003
See application file for complete search history.

(56) References Cited

U.S. PATENT DOCUMENTS

| | | | | |
|---|---|---|---|---|
| 4,665,299 A | * | 5/1987 | Iwata | B23K 9/1056 |
| | | | | 219/130.21 |
| 9,314,866 B2 | * | 4/2016 | Lambert | B23K 9/0956 |
| 2008/0083705 A1 | * | 4/2008 | Peters | B23K 9/091 |
| | | | | 219/61 |
| 2010/0230389 A1 | * | 9/2010 | Hsu | B23K 9/205 |
| | | | | 219/74 |

(Continued)

FOREIGN PATENT DOCUMENTS

| | | |
|---|---|---|
| JP | 09084388 | 3/1997 |
| WO | 2008045584 | 4/2008 |

OTHER PUBLICATIONS

International Searching Authority; "International Search Report and Written Opinion," issued in connection with International Patent Application No. PCT/US2019/024869, dated Jul. 30, 2019, 27 pages.

*Primary Examiner* — Geoffrey S Evans
(74) *Attorney, Agent, or Firm* — McAndrews, Held & Malloy, Ltd.

(57) ABSTRACT

Apparatuses, systems, and/or methods for synchronization of control circuits of welding power supplies are disclosed. In some examples, welding-type power supplies use a modified pulse width modulated (PWM) control signal, in conjunction with certain fail safes, for synchronization of control circuitry. The welding-type power supplies may include conversion circuitry that converts and/or regulates input power to welding-type power. Control circuitry may provide control signals to control the conversion and/or regulation of the input power via the conversion circuitry. The control circuitry may be comprised of a first control circuit and a second control circuit. The first and second control circuit may synchronize their operations using a synchronization signal (e.g., comprised of a modified PWM control signal).

14 Claims, 8 Drawing Sheets

(56) References Cited

U.S. PATENT DOCUMENTS

2016/0144442 A1* 5/2016 Tanaka ................... B23K 9/173
                                                       219/130.31
2018/0056427 A1* 3/2018 Forslund .............. B23K 9/0953
2018/0339356 A1* 11/2018 Mnich .................. B23K 9/0677

* cited by examiner

CONTROL CIRCUIT SYNCHRONIZATION OF WELDING-TYPE POWER SUPPLIES

TECHNICAL FIELD

The present disclosure generally relates to welding-type power supplies and, more particularly, to synchronization of control circuits of welding power supplies.

BACKGROUND

Welding-type power supplies perform power conversion and/or regulation in order to produce power outputs that are suitable for welding-type operations. Different welding-type operations may require different power outputs, and/or have different power demands. Even within the same welding-type operation, different power outputs may be needed for different tasks and/or at different times. Control circuitry is sometimes used to control the power conversion in order to produce the different power outputs. The control circuitry may allow the power supplies to timely and/or effectively respond to changing circumstances, so as to support different welding-type operations.

Limitations and disadvantages of conventional and traditional approaches will become apparent to one of skill in the art, through comparison of such systems with the present disclosure as set forth in the remainder of the present application with reference to the drawings.

SUMMARY

The present disclosure is directed to apparatus, systems, and methods for synchronization of control circuits of welding power supplies, for example, substantially as illustrated by and/or described in connection with at least one of the figures, and as set forth more completely in the claims.

These and other advantages, aspects and novel features of the present disclosure, as well as details of an illustrated example thereof, will be more fully understood from the following description and drawings.

DETAILED DESCRIPTION

Figure 1:
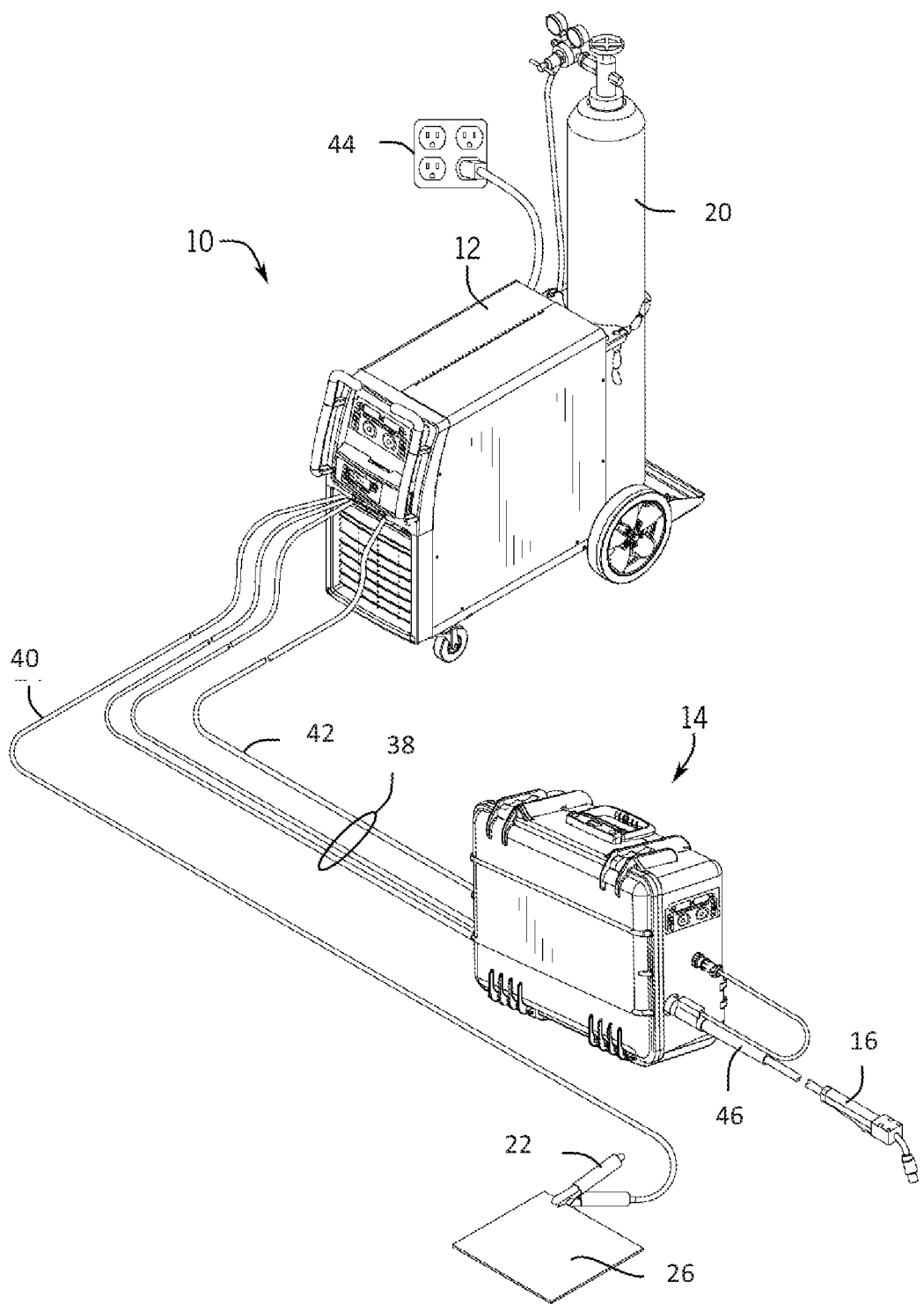
FIG. 1 illustrates an example of a welding-type system, in accordance with aspects of this disclosure.

Preferred examples of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As used herein, the terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As used herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, circuitry is "operable" and/or "configured" to perform a function whenever the circuitry comprises the necessary hardware and/or code (if any is necessary) to perform the function, regardless of whether performance of the function is disabled or enabled (e.g., by a user-configurable setting, factory trim, etc.).

As utilized herein, the terms "e.g.," and "for example" set off lists of one or more non-limiting examples, instances, or illustrations.

As used herein, the term "data" any indicia, signals, marks, symbols, domains, symbol sets, representations, and any other physical form or forms representing information, whether permanent or temporary, whether visible, audible, acoustic, electric, magnetic, electro-magnetic, or otherwise manifested. The term "data" is used to represent predetermined information in one physical form, encompassing any and all representations of corresponding information in a different physical form or forms.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

As used herein, a welding-type power supply and/or power source refers to any device capable of, when power is applied thereto, supplying welding, cladding, brazing, plasma cutting, induction heating, laser (including laser welding, laser hybrid, and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

As used herein, welding-type power refers to power suitable for welding, cladding, brazing, plasma cutting, induction heating, CAC-A and/or hot wire welding/preheating (including laser welding and laser cladding), carbon arc cutting or gouging, and/or resistive preheating.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein, the term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device.

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

Some examples of the present disclosure relate to a welding-type power supply, comprising a first control circuit configured to periodically initiate a process at a process frequency, where the process adjusts the process frequency based on a synchronization signal, and a second control circuit configured to generate the synchronization signal.

In some examples, the first control circuit is further configured to detect one or more of an edge or level of the synchronization signal, the adjustment to the process frequency being based on the detection. In some examples, the first control circuit comprises an edge detection circuit configured to detect one or more of an edge or level of the synchronization signal and to set a flag in response to the detection, the adjustment to the process frequency being based on the synchronization signal and the flag. In some examples, the welding-type power supply further comprises a conversion circuit configured to convert input power to welding-type output power, where the second control circuit is further configured to control the conversion circuit using at least a pulse width modulated (PWM) control signal. In some examples, the process further determines a command signal based on operator input, and the second control circuit is further configured to control the conversion circuit using at least a pulse width modulated (PWM) control signal, the PWM control signal being based on the command signal. In some examples, the synchronization signal is based on the PWM control signal. In some examples, the second control circuit is configured to control the conversion circuit via two or more PWM control signals, and configured to output the synchronization signal as a PWM signal having a phase based on at least one of the two or more PWM control signals. In some examples, the first control circuit is configured to measure a feedback signal representative of the welding-type output power, and the first control circuit is configured to determine the command signal based on the measured feedback signal and the operator input, the operator input comprising at least one of a voltage setpoint and a current setpoint.

Some examples of the present disclosure relate to a welding-type system synchronization method, comprising generating a synchronization signal, via a second control circuit of a welding-type power supply, and initiating a process according to a process frequency, via a first control circuit of the welding-type power supply, where the process adjusts the process frequency based on the synchronization signal.

In some examples, the method further comprises detecting one or more of an edge or level of the synchronization signal, via the second control circuit, the adjustment of the process frequency based on the detection. In some examples, the method further comprises detecting one or more of an edge or level of the synchronization signal, via an edge detection circuit of the first control circuit, and setting a flag in response to the detection, the adjustment of the process frequency further based on a the flag. In some examples, the method further comprises converting input power to welding-type output power, via a conversion circuit of the welding-type power supply, the conversion circuit controlled by a PWM control signal of the second control circuit, where the welding-type output power is used to power a welding-type process. In some examples, the process further determines a command signal based on operator input, via the first control circuit, the second control circuit configured to modify the PWM control signal based on the command signal. In some examples, the second control circuit is configured to control the conversion circuit via two or more PWM control signals, and configured to generate the synchronization signal as a PWM signal having a phase based on at least one of the two or more PWM control signals. In some examples, the process further comprises measuring a feedback signal representative of the welding-type output power, via the first control circuit, the command signal based on the feedback signal and the operator input, the operator input comprising at least one of a voltage setpoint and a current setpoint.

Some examples of the present disclosure relate to a welding-type system, comprising a welding-type power supply, the welding type power supply comprising a first control circuit configured to periodically initiate a process at a process frequency, where the process adjusts the process frequency based on a synchronization signal, and a second control circuit configured to generate the synchronization signal.

In some examples, the first control circuit is further configured to detect one or more of an edge or level of the synchronization signal, the adjustment to the process frequency being based on the detection. In some examples, the first control circuit comprises an edge detection circuit configured to detect one or more of an edge or level of the synchronization signal and to set a flag in response to the detection, the adjustment to the process frequency being based on the synchronization signal and the flag. In some examples, the welding-type power supply further comprises a conversion circuit configured to convert input power to welding-type output power, where the second control circuit is further configured to control the conversion circuit using at least a pulse width modulated (PWM) control signal, where the synchronization signal is based on the PWM control signal. In some examples, the second control circuit is configured to control the conversion circuit via two or more PWM control signals, and configured to generate the synchronization signal as a PWM signal having a phase based on at least one of the two or more PWM control signals.

Some examples of the present disclosure relate to welding-type power supplies that use a modified pulse width modulated (PWM) control signal, in conjunction with certain fail safes, for synchronization of control circuitry. Example welding-type power supplies include conversion circuitry that converts and/or regulates input power to welding-type power. The control circuitry provides control signals to control the conversion and/or regulation of the input power via the conversion circuitry. The control circuitry may be comprised of a first control circuit and a second control circuit. The first and second control circuit may synchronize their operations using a synchronization signal (e.g., comprising the modified PWM control signal).

Figure 2:
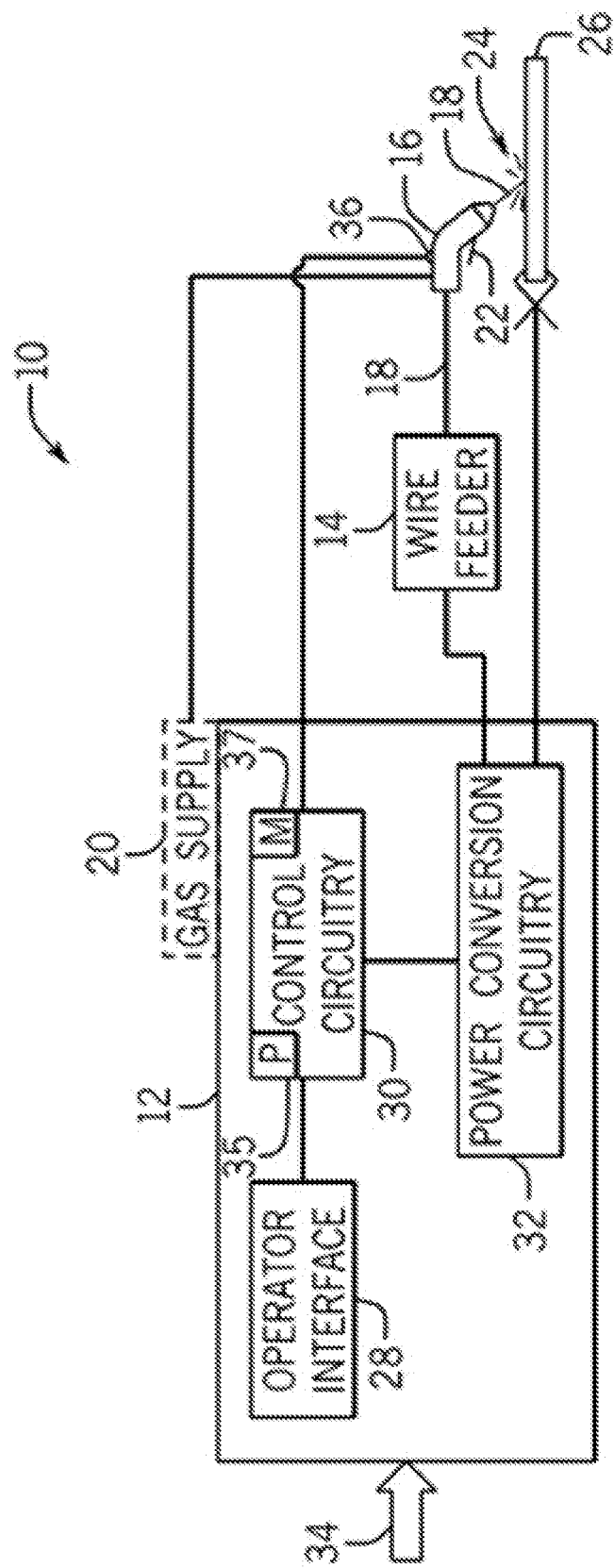
FIG. 2 is a block diagram of the example welding-type system of FIG. 1, in accordance with aspects of this disclosure.

FIGS. 1 and 2 show a perspective view and block diagram view, respectively, of an example of a welding-type system 10. It should be appreciated that, while the example welding-type system 10 shown in FIGS. 1 and 2 may be described as a gas metal arc welding (GMAW) system, the presently disclosed system may also be used with other arc welding processes (e.g., flux-cored arc welding (FCAW), gas shielded flux-cored arc welding (FCAW-G), gas tungsten arc welding (GTAW), submerged arc welding (SAW), shielded metal arc welding (SMAW), or similar arc welding processes) or other metal fabrication systems, such as plasma cutting systems, induction heating systems, and so forth.

In the example of FIG. 1, the welding-type system 10 includes a welding-type power supply 12 (i.e., a welding-type power source), a welding wire feeder 14, a gas supply 20, and a welding torch 16. The welding-type power supply 12 generally supplies power for the welding-type system 10 and/or other various accessories, and may be coupled to the welding wire feeder 14 via one or more weld cables 38, as well as coupled to a work piece 26 using a lead cable 40 having a clamp 22. In the illustrated example, the welding wire feeder 14 is coupled to the welding torch 16 via coupler 46 in order to supply welding wire and/or welding-type power to the welding torch 16 during operation of the welding-type system 10. In some examples, the welding-type power supply 12 may couple and/or directly supply welding-type power to the welding torch 16. In the illustrated example, the power source 12 is separate from the wire feeder 14, such that the wire feeder 14 may be positioned at some distance from the power source 12 near a welding location. However, it should be understood that the wire feeder 14, in some examples, may be integral with the power source 12. In some examples, the wire feeder 14 may be omitted from the system 10 entirely.

In the examples of FIGS. 1 and 2, the welding-type system 10 includes a gas supply 20 that may supply a shielding gas and/or shielding gas mixtures to the welding torch 16. A shielding gas, as used herein, may refer to any gas or mixture of gases that may be provided to the arc and/or weld pool in order to provide a particular local atmosphere (e.g., shield the arc, improve arc stability, limit the formation of metal oxides, improve wetting of the metal surfaces, alter the chemistry of the weld deposit, and so forth). In the example of FIG. 1, the gas supply 20 is coupled to the welding torch 16 through the wire feeder 14 via a gas conduit 42 that is part of the weld cables 38 from the welding-type power supply 12. In such an example, the welding wire feeder 14 may regulate the flow of gas from the gas supply 20 to the welding torch 16. In the example of FIG. 2, the gas supply 20 is depicted as coupled directly to the welding torch 16 rather than being coupled to the welding torch 16 through the wire feeder 14.

In the example of FIG. 2, the wire feeder 14 supplies a wire electrode 18 (e.g., solid wire, cored wire, coated wire) to the torch 16. The gas supply 20, which may be integral with or separate from the power source 12, supplies a gas (e.g., $CO_2$, argon) to the torch 16. In some examples, no gas supply 20 may be used. An operator may engage a trigger 22 of the torch 16 to initiate an arc 24 between the electrode 18 and a work piece 26. In some examples, engaging the trigger 22 of the torch 16 may initiate a different welding-type function, instead of an arc 24.

In the example of FIG. 2, the welding-type power supply 12 include power conversion circuitry 32 that receives input power from a power source 34 (e.g., the AC power grid, an engine/generator set, or a combination thereof), conditions the input power, and provides DC and/or AC welding-type output power via the weld cable 38. As such, the welding-type power supply 12 may power the welding wire feeder 14 that, in turn, powers the welding torch 16, in accordance with demands of the welding-type system 10. The lead cable 40 terminating in the clamp 22 couples the welding-type power supply 12 to the work piece 26 to close the circuit between the welding-type power supply 12, the work piece 26, and the welding torch 16.

In the example of FIG. 2, the welding-type power supply 12 includes an operator interface 28, control circuitry 30, and power conversion circuitry 32. The power conversion circuitry 32 may include circuit elements (e.g., transformers, rectifiers, capacitors, inductors, diodes, transistors, switches, and so forth) capable of converting the AC input power to a direct current electrode positive (DCEP) output, direct current electrode negative (DCEN) output, DC variable polarity, and/or a variable balance (e.g., balanced or unbalanced) AC output, as dictated by the demands of the welding-type system 10 (e.g., based on the type of welding process performed by the welding-type system 10, and so forth).

The control circuitry 30 may control the power conversion circuitry 32 to produce the appropriate welding-type power. In the example of FIG. 2, the control circuitry comprises one or more processors 35 and/or memory 37. The processor(s) 35 may include one or more microprocessors, such as one or more "general-purpose" microprocessors, one or more special-purpose microprocessors and/or application specific integrated circuits (ASICS), or some combination thereof. For example, the processor(s) may include one or more reduced instruction set (RISC) processors (e.g., Advanced RISC Machine (ARM) processors), one or more digital signal processors (DSPs), and/or other appropriate processors. The one or more processors 35 may use data stored in the memory 37 to execute control algorithms. The data stored in the memory 37 may be received via the operator interface 28, one or more input/output ports, a network connection, and/or be preloaded prior to assembly of the control circuitry 30.

In some examples, the welding-type system 10 may receive weld settings from the operator via the operator interface 28 provided on the power source 12 (and/or power source housing, such as on a front panel of the power source housing, for example). The weld settings may relate to the type of welding-type power desired. In the example of FIG. 2, the operator interface 28 is coupled to the control circuitry 30, and may communicate the weld settings to the control circuitry 30 via this coupling.

In the example of FIG. 2, the control circuitry 30 is coupled to the power conversion circuitry 32, which may supply the welding-type power (e.g., pulsed waveform) that is applied to the torch 16. In the example of FIG. 2, the power conversion circuitry 32 is coupled to a source of electrical power as indicated by arrow 34. The source may be a power grid, an engine-driven generator, batteries, fuel cells or other alternative sources. In the example of FIG. 1, the source is an electrical outlet 44. In some examples, the control circuitry 30 operates to control the conversion circuitry 32, so as to ensure the conversion circuitry 32 generates the appropriate welding-type power for carrying out the desired welding-type operation. In some examples, the control circuitry 30 may control the power conversion circuitry 32 to produce an appropriate and/or desired current and/or voltage of the welding-type power supplied to the torch 16, as selected, for example, by an operator through the operator interface 28.

The control circuitry 30 may monitor the current and/or voltage of the arc 24 using on one or more sensors 36 positioned on, within, along, and/or proximate to the wire feeder 14, weld cable 38, and/or torch 16. The one or more sensors 36 may comprise, for example, current sensors, voltage sensors, impedance sensors, and/or other appropriate sensors. In some examples, the control circuitry 30 may determine and/or control the power conversion circuitry 32 to produce an appropriate power output, arc length, and/or electrode extension based at least in part on feedback from the sensors 36.

Figure 3:
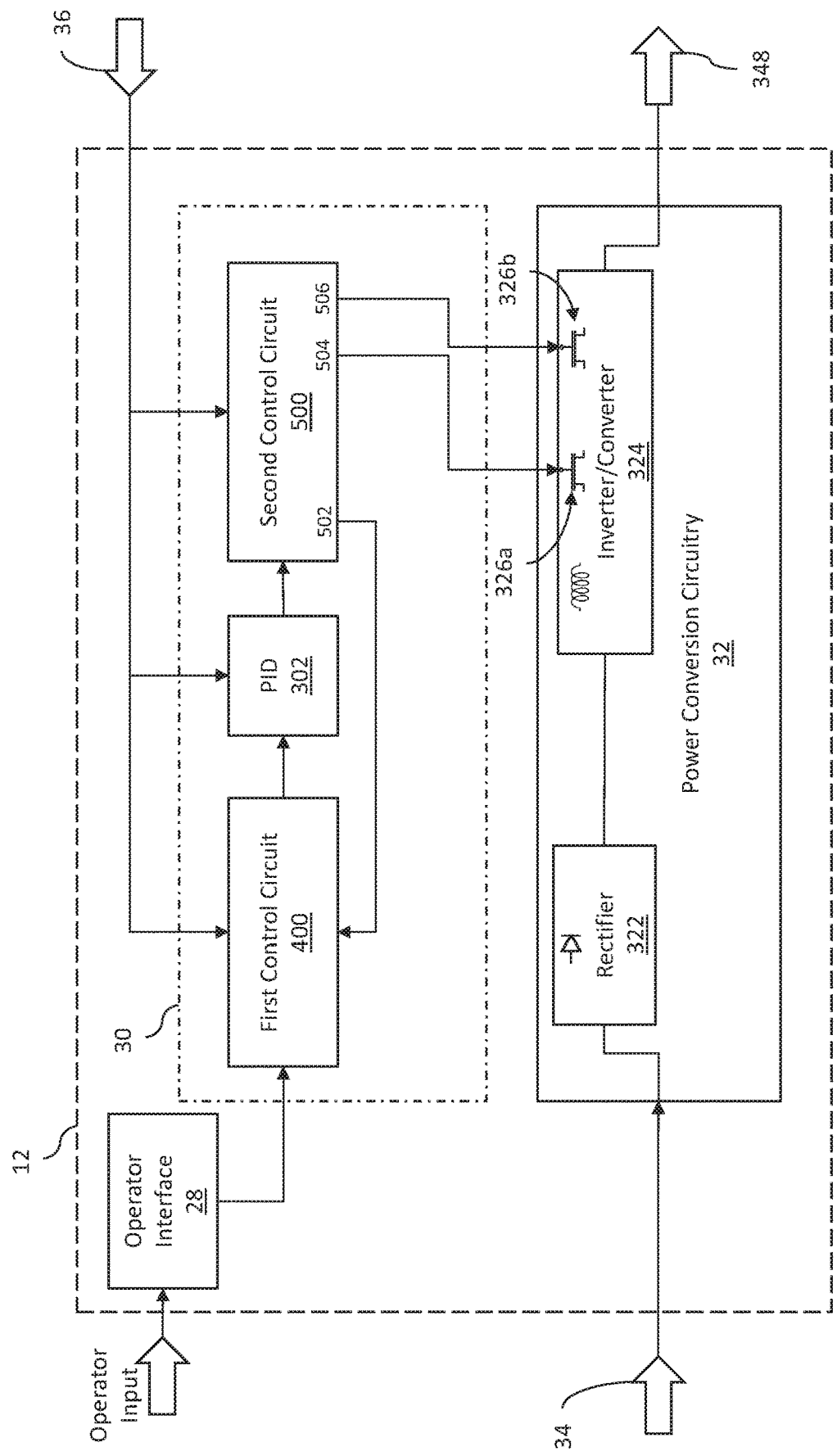
FIG. 3 is a block diagram of an example welding-type power supply of the welding-type system of FIG. 1, in accordance with aspects of this disclosure.
Figure 4:
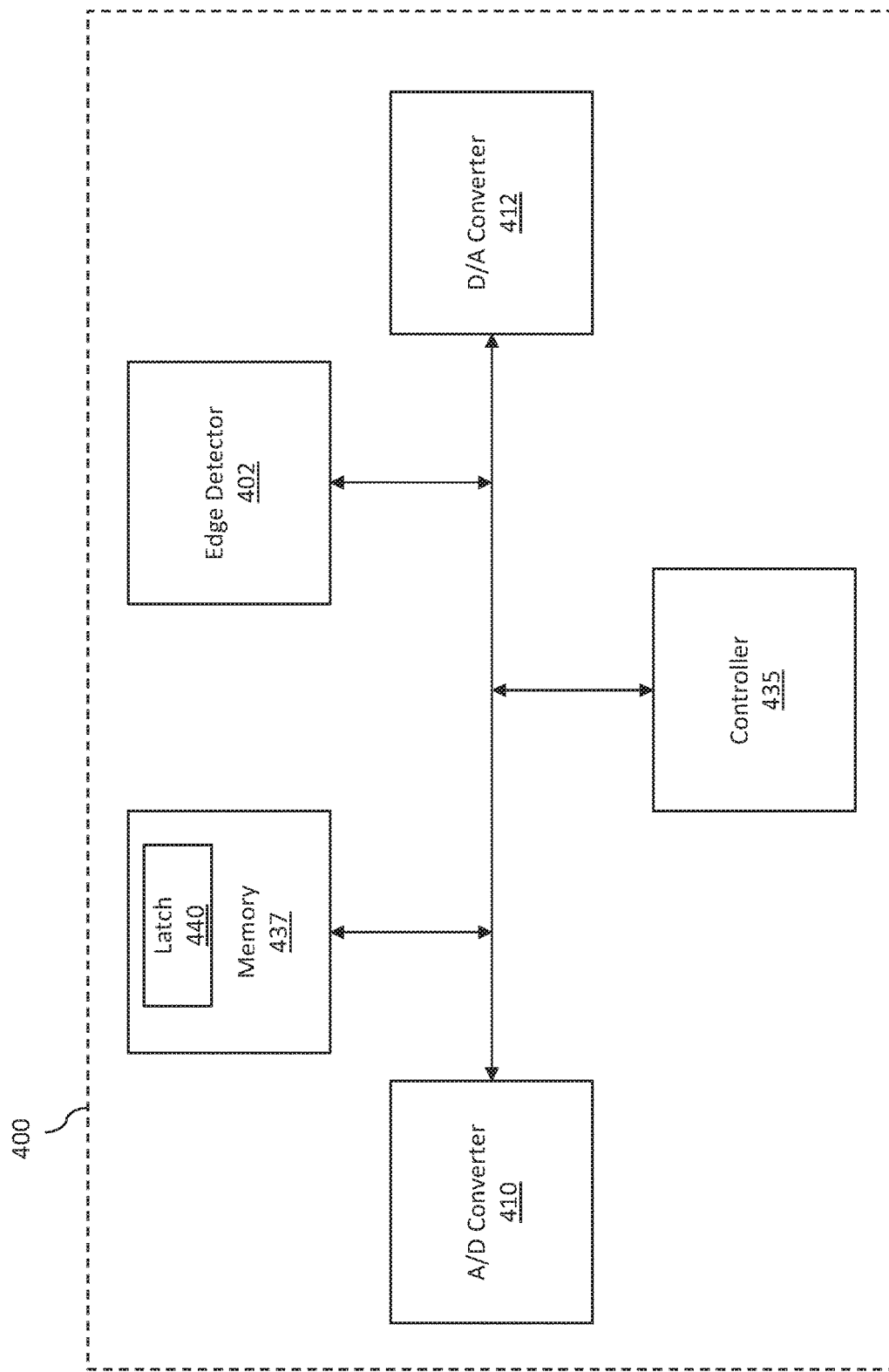
FIG. 4 is a block diagram of an example first control circuit of the welding-type power supply of FIG. 3, in accordance with aspects of this disclosure.
Figure 5:
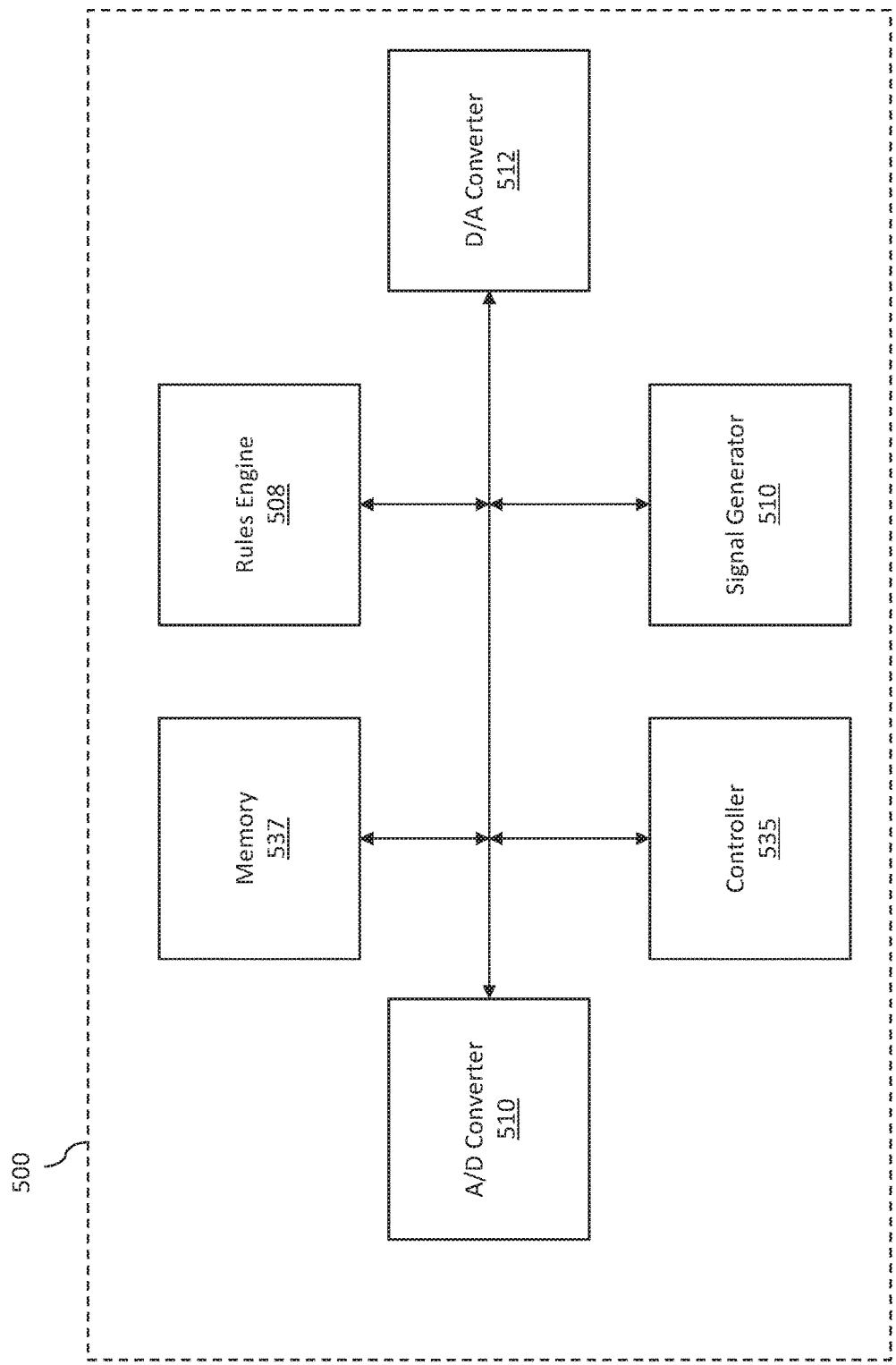
FIG. 5 is a block diagram of an example second control circuit of the welding-type power supply of FIG. 3, in accordance with aspects of this disclosure.

FIGS. 3-5 are block diagrams illustrating the control circuitry 30 and power conversion circuitry 32 in more detail. As shown in the example of FIG. 3, the control circuitry 30 may include a first control circuit 400 coupled to a second control circuit 500 through a proportional integral derivative (PID) circuit 302. In some examples, the PID circuit 302 may be an analog circuit. In some examples, the PID circuit 302 may be implemented in a controller. In some examples, the first control circuit 400 and/or second control circuit 500 may be implemented through integrated circuit packages, and/or may be embodied in processors (e.g., processors 35). In some examples, the first control circuit 400 may be embodied in an ARM-based processor, while the second control circuit 500 is embodied in a digital signal processor (DSP).

As shown in the example of FIG. 3, the first control circuit 400 receives inputs from the feedback sensors 36, as indicated by the arrow, as well as from the operator interface 28, and the second control circuit 500. The first control circuit 400 also has an output through which the first control circuit 400 may send a command signal. In the example of FIG. 3, the output is filtered via the PID circuit 302. For example, an operator may input weld settings through the operator interface 28 that are transmitted to the first control circuit 400. The first control circuit 400 may output a command signal based on the feedback from the sensors 36 in conjunction with the operator input received through the operator interface 28.

As shown in the example of FIG. 3, the second control circuit 500 receives inputs from the feedback sensors 36 (as indicated by the arrow 36), as well as from the PID circuit 302. As depicted, the second control circuit 500 also has several outputs, including a synchronization signal output 502, a first control signal output 504, and a second control signal output 506. A synchronization signal may be sent to the first control circuit 400 via the synchronization signal output 502. The synchronization signal may be used by the first control circuit 400 to synchronize its operation with that of the second control circuit 500.

A first control signal is output from the first control signal output 504 of the second control circuit 500, and a second control signal is output from the second control signal output 506 of the second control circuit 500. The first and second control signals are received by the power conversion circuitry 32 and used to control certain aspects of the power conversion circuitry 32, as explained further below. While only first and second control signal outputs 504, 506 are depicted in the example of FIG. 3, in other examples, more (or less) control signal outputs may be used. Additionally, while each control signal output 504, 506 is depicted as output to a single line, in practice each control signal output 504, 506 may in fact be output to a plurality of lines (and/or leads, wires, conductors, etc.).

FIG. 4 shows a block diagram illustrating example components of the first control circuit 400. As shown in the example of FIG. 4, the first control circuit 400 includes an analog to digital converter (ADC) 410, a digital to analog converter (DAC) 412, an edge detector 402, a controller 435, and a memory 437. As depicted, the memory 437 further includes one or more latches 440. In some examples the edge detector 402 may be configured to detect a rising and/or falling edge of the synchronization signal and set a flag of the latch 440 when a rising and/or falling edge is detected. The ADC 410 may be configured to sample analog signals and convert them to digital signals. For example, the ADC 410 may sample the analog feedback signals provided by the sensors 36. The DAC 412 may convert digital signals of the first control circuit 400 to analog signals. For example, in examples where the PID circuit 302 is an analog circuit, the DAC 412 may convert a digital command signal to an analog command signal before providing the command signal to the PID circuit 302. The controller 435 may be configured to control the various components of the first control circuit 400. In some examples, the controller 435 may retrieve program instructions stored in the memory 437 to execute its operation and/or control processes.

FIG. 5 shows a block diagram illustrating example components of the second control circuit 500. As depicted, the second control circuit 500 includes an ADC 510, a DAC 512, a rules engine 508, a signal generator 510, a memory 537, and a controller 535. The controller 535 may be configured to control the various components of the second control circuit 500. In some examples, the controller 535 may retrieve program instructions stored in the memory 537 to execute its operation and/or control processes. The ADC 510 may be configured to sample analog signals and convert them to digital signals. For example, the ADC 510 may sample the analog feedback signals provided by the sensors 36. The DAC 512 may convert digital signals of the first control circuit 400 to analog signals. For example, the DAC 512 may convert a digital version of the first control signal and/or second control signal to one or more analog signals before transmitting to the conversion circuitry 32. The signal generator 510 may be configured to generate PWM signals (and/or other signals). For example, the signal generator 510 may be used to generate the synchronization signal, first control signal, and/or second control signal.

The signal generator 510 may be configured to generate signals according to rules of rules engine 508. For example, the rules engine 508 may apply certain rules to the signal generation of the first and second control signals to avoid certain undesirable outcomes. More particularly, the rules engine may apply certain rules to the signal generation to avoid inductor saturation in the power conversion circuitry 32 (e.g., in an inverter/converter 324 of the power conversion circuitry 32) and/or elsewhere in the welding-type power supply 12.

In some examples, the first control circuit 400 and/or second control circuit 500 may be integrated circuit packages, such as processors, for example. In some examples, the first control circuit 400 may be an ARM processor and/or ARM microcontroller (e.g., a 32 bit ARM processor/microcontroller). Advantageously, ARM processors may be relatively inexpensive, and/or may include a broad set of interfaces for connection to peripherals, such as through universal serial bus (USB), Ethernet, serial communication ports, etc. In some examples, the second control circuit 500 may be a DSP. Advantageously, DSPs may have fairly sophisticated and/or flexible signal generators, which may be useful for generating the various signals. In some examples, the first control circuit 400, second control circuit 500, and/or PID circuit 302 may be coupled together on a common circuit board comprising all or part of the control circuitry 30. In some examples, the first control circuit 400, second control circuit 500, and/or PID circuit 302 may be coupled together using two or more circuit boards.

In the example of FIG. 3, the power conversion circuitry is depicted as comprising rectifier circuitry 322 and inverter/converter circuitry 324. As depicted, the rectifier 322 receives input power via a power source 34, as indicated by arrow 34. The rectifier 322 is configured to convert that input AC power to DC power, which may flow from the rectifier 322 through a DC bus to the inverter/converter 324. The inverter/converter circuitry 324 may comprise circuitry configured to convert the DC power to AC welding-type power and/or convert the DC power to DC welding-type power. The inverter/converter circuitry 324 may further comprise circuitry configured to modify characteristics of the DC and/or AC power (e.g., magnitude, frequency, etc.). In some examples, the power conversion circuitry 32 comprises a switched mode power supply, and/or the inverter/converter circuitry 324 may include one or more full bridge inverters, half bridge inverters, buck converters, boost converters, and/or other appropriate circuitry. As depicted in the example of FIG. 3, the inverter/converter circuitry 324 outputs the converted power through the weld cables 38 and/or lead cable 40, as depicted by the arrow 348.

In the example of FIG. 3, the inverter/converter circuitry 324 receives inputs from the second control circuit 500. More particularly, the inverter/converter circuitry 324 includes controllable circuit elements 326 that receive signals from first control signal output 504 and second control signal output 506 of the second control circuit 500. More particularly, at least a first set of controllable circuit elements 326a receives a first control signal from a first control signal output 504 and a second set of controllable circuit elements 326b receives a second control signal from a second control signal output 506 of the second control circuit 500. The first and second controllable circuit elements 326a, 326b are configured to turn off and on in response to inputs from the first and second control signals, respectively.

While the first control signal output 504 and second control signal output 506 are depicted in FIG. 3 as having only a single signal line output, it should be understood that each control signal output 504, 506 may in fact be comprised of a plurality of lines. Additionally, each set of controllable circuit elements 326 may comprise a plurality of controllable circuit elements to receive the plurality of lines. The controllable circuit elements 326 may comprise circuitry such as, for example, switches, relays, transistors, etc. In examples where the controllable circuit elements 326 comprise transistors, the transistors may comprise any suitable transistors, such as, for example MOSFETs, JFETs, IGBTs, BJTs, etc.

Figure 6:
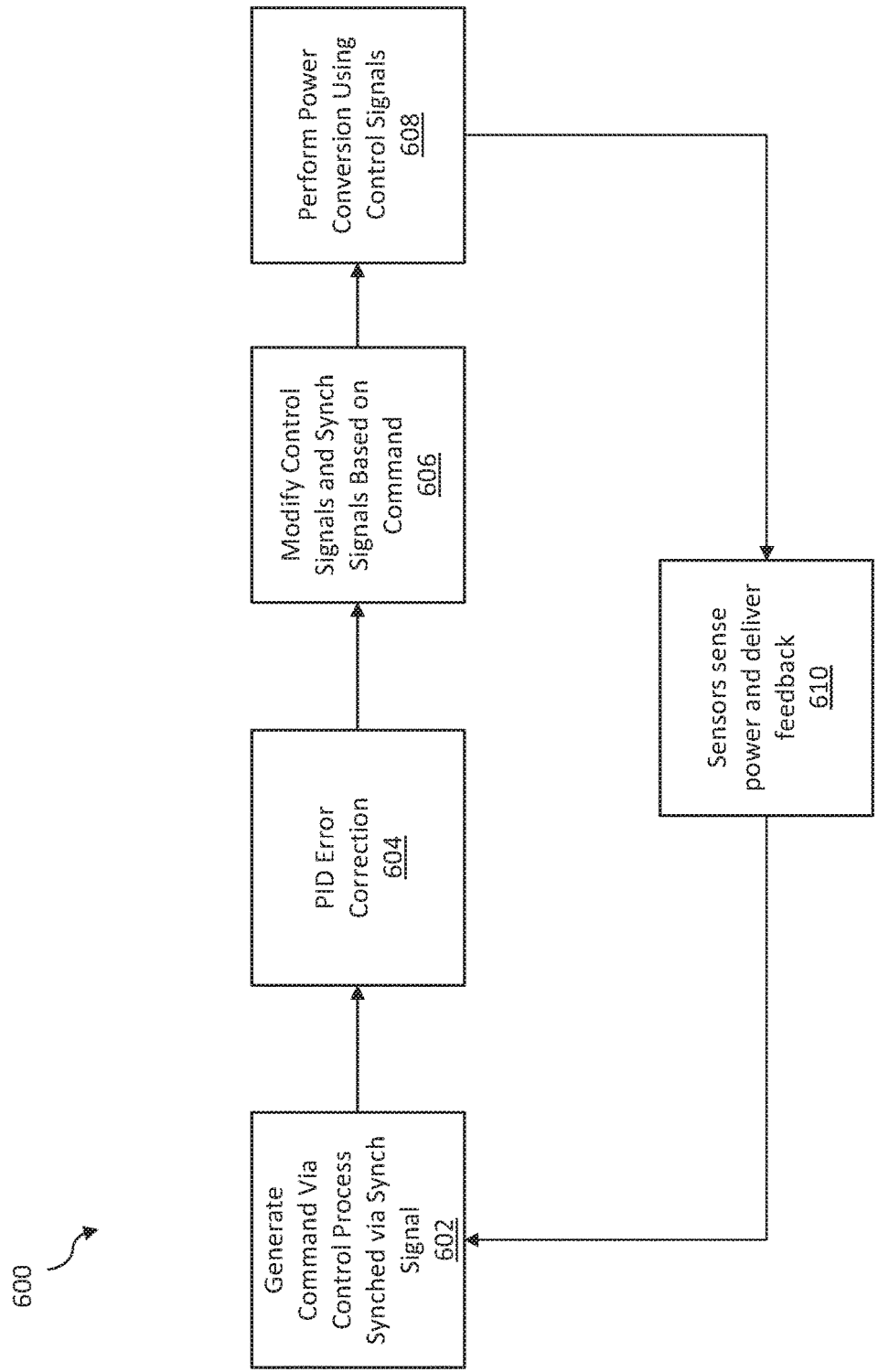
FIG. 6 is a flow chart of an example operation of the welding-type power supply of FIG. 3, in accordance with aspects of this disclosure.

FIG. 6 illustrates an example operation 600 of the welding-type system 10. At step 602, the first control circuit 400 adjusts its process frequency (described further below) using the synchronization signal from the synchronization signal output 502 of the second control circuit 500. Also at step 602, the first control circuit 400 outputs a command signal to the PID circuit 302 based on operator input received from the operator interface 28 in conjunction with feedback from the sensors 36. For example, an operator may input weld settings through the operator interface 28 that are transmitted to the first control circuit 400. The first control circuit 400 may output a command signal based on the feedback from the sensors 36 in conjunction with the operator input received through the operator interface 28. For example, an operator may indicate a desire for a constant voltage and/or constant power output at a certain level, and the first control circuit 400 may determine an appropriate modification of the present welding-type power output to produce the desired constant voltage and/or constant current power output, based on feedback (e.g., current, voltage, and/or impedance) from the sensors 36. The command signal output by the first control circuit 400 to the PID circuit 302 may be representative of the desired welding-type output power, one or more desired characteristics of the output power, appropriate changes to the output power that would bring it into line with the desired output power, and/or appropriate changes to the first and/or second control signals that would produce the desired welding-type output power with any desired characteristics.

At step 604, the PID circuit 302 receives the command signal from the first control circuit 400. The PID circuit 302 processes the command signal and performs error corrective operations on the command signal received from the first control circuit 400. The PID circuit 302 may also use feedback input from the sensors 36 in its operation. The PID circuit 302 outputs an error corrected command signal representative of the command signal to the second control circuit 500.

At step 606, the second control circuit 500 receives the command signal (and/or error corrected command signal) from the PID circuit 302. The second control circuit 500 may then use the command signal (and/or the PID circuit 302 outputted error corrected command signal) to modify the characteristics of its first and second control signals, to control the power conversion circuitry 32 (e.g., the inverter/converter circuitry 324) to produce the desired welding-type power output. Thus, at step 606, the second control circuit 500 outputs control signals to the inverter/converter circuitry 324 via the first control signal output 504 and/or second control signal output 506.

At step 608, the first control signal from the first control signal output 504 controls a first series (and/or plurality) of controllable circuit elements 326a in the inverter/converter circuitry 324, and the second control signal output from the second control signal output 506 controls a second series (and/or plurality) of controllable circuit elements 326b in the inverter/converter circuitry 324. By adjusting characteristics of the first and second control signals (e.g., duty cycle, phase, frequency, etc.), the second control circuit 500 may change how and when the controllable circuit elements 326 are activated and/or deactivated in the inverter/converter circuit 324, which may thereby change the characteristics of the welding-type power output by the inverter/converter circuitry 324. For example, increasing the duty cycle of the first and/or second control signals may increase the welding-type power output, while decreasing the duty cycle of the first and/or second control signals may decrease the welding-type power output.

At step 610, the sensors 36 detect the power output characteristics and deliver feedback to the first control circuit 400, PID circuit 302, and/or second control circuit 500, so that the next iteration of the operation can take place.

The first control circuit 400 is configured to regularly initiate a process 700 of determining the appropriate command signal. In examples where the first control circuit 400 is a microcontroller and/or processor, the process 700 may be initiated via a processor interrupt. In some examples, the first control circuit 400 may output a different command signal for each of the first and second control signals. Thus, the first control circuit 400 may initiate a first process to determine an appropriate adjustment to the first control signal, and outputs a corresponding first command signal. Thereafter, the first control circuit 400 may initiate a second process to determine an appropriate adjustment to the second control signal, and outputs a corresponding second command signal.

The process 700 is regularly initiated at a process frequency set by the first control circuit 400. The process frequency is configured to allow the first control circuit 400 enough time to finish its operations, output a command signal, and have the command signal propagate through the PID circuit 302 to the second control circuit 500 before the next signal period of the corresponding control signal begins. In order for the second control circuit 500 to timely modify the first and/or second control signals, the command signal (and/or error corrected command signal) must be received before the next signal period in order for the control signal characteristics for that next signal period to be adjusted (if needed). Thus, synchronization may be useful, lest certain drawbacks of asynchronous operation manifest. In examples where the first control circuit 400 and second control circuit 500 have no (and/or few, limited, etc.) common clocks, frequencies, and/or other ways of remaining in synch, the synchronization signal may be particularly useful.

The first control circuit 400 may determine the process frequency using the synchronization signal sent from the second control circuit 500. In some examples, the synchronization signal may be a PWM signal, such as, for example, a phase and/or frequency adjusted first control signal and/or second control signal. During each processing period, the first control circuit 400 may adjust the processing frequency in an attempt to more closely align the start of the process with a rising edge of the synchronization signal. For example, the first control circuit 400 may increase the processing frequency in response to the synchronization signal (and/or a level of the synchronization signal) being low and/or decrease the processing frequency in response to the synchronization signal being high. The idea being that a high synchronization signal will indicate that a rising edge has just passed, and therefore decreasing the process frequency (e.g., increasing the time and/or interval between process initiations) may move the process initiation time closer to the rising edge. Conversely a low synchronization signal may indicate that a rising edge has not yet occurred, and therefore increasing the process frequency (e.g., decreasing the time and/or interval between process initiations) may move the process initiation time closer to the rising edge. In some examples, the first control circuit 400 may adjust the processing frequency in an attempt to more closely align the start of the process with a falling edge, or with either or both of a rising and/or falling edge of the synchronization signal.

In some examples, the first control circuit 400 may adjust the process frequency between certain settings. For example, the process frequency may be adjusted between slow, medium/neutral, and/or fast settings. Medium and/or neutral may correspond to a nominal frequency (e.g., approximately 40 kHz), while slow may correspond to a slightly slower and/or decreased frequency (e.g., approximately 39.999 kHz), and fast may correspond to a slightly faster and/or increased frequency (e.g., approximately 40.001 kHz). In some examples, there may be more settings, such as dead slow, very slow, very fast, blindingly fast, etc. In some examples, the adjustments may be incremental adjustments (e.g., increase/decrease frequency by x, 2x, 3x, etc.) rather than adjustments between certain settings. In some examples, there may be more than one process and/or more than one process frequency. For example, the first control circuit 400 may initiate a first process at a first process frequency to output a command corresponding to desired adjustments to the first control signal, and may initiate a second process at a second process frequency to output a command corresponding to desired adjustments to the second control signal.

Figure 7:
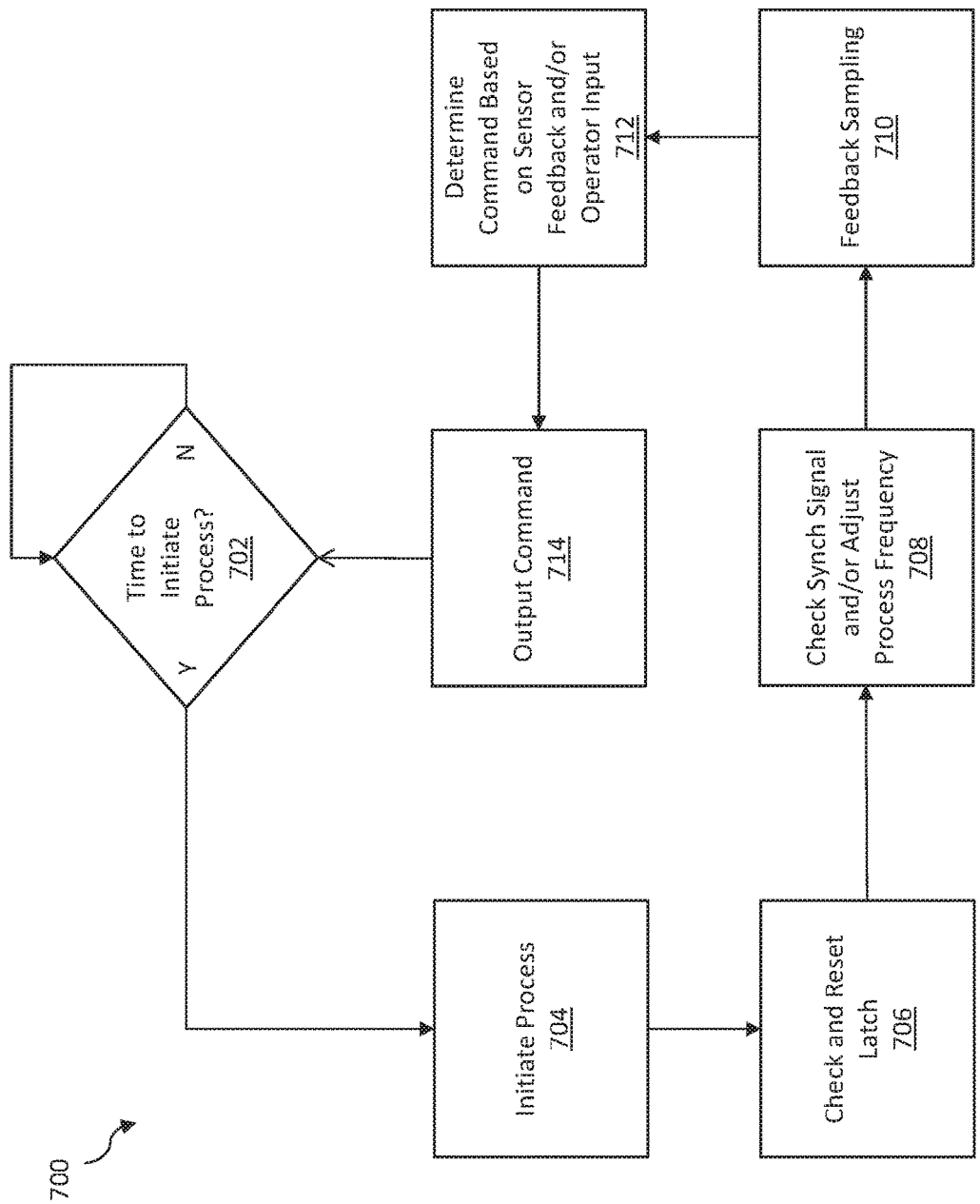
FIG. 7 is a flow chart of an example process of the first control circuit of FIG. 4, in accordance with aspects of this disclosure.

FIG. 7 illustrates an example process 700 of the first control circuit 400. At step 702, the first control circuit 400 checks to determine whether it is time to initiate the process 700, based on the present and/or previously established process frequency. If it is not time to initiate the process 700, step 702 will repeat. If it is time to initiate the process, the process initiates at step 704.

After initiation, the first control circuit 400 checks the status of the flag of the latch 440 set by the edge detector 402 at step 706. The edge detector 402 may operate independently of the process 700, and set a flag of the latch 440 when the edge detector 402 detects a rising (and/or, in some examples, falling) edge of the synchronization signal. The regular initiation of the process 700 at the process frequency, in conjunction with the edge detector 402 and/or latch 440, acts as a safeguard to ensure the first control circuit 400 can perform some sort of synchronization even if some of the synchronization signal (e.g., and/or an edge of the synchronization signal) is not detected because of noise, distortion, error, etc. If, for example, there was no latch 440 and/or regular process initiation, and the process 700 instead only initiated on an edge of the synchronization signal, then the process 700 may fail to initiate at all if the edge is undetected, which may result in unmodified output power and/or other undesirable outcomes. At the end of step 706, after checking the flag of the latch 440, the latch 440 is reset for the next edge detection.

At step 708, the process frequency is adjusted. If the first control circuit 400 found that the flag of the latch 440 was not set, then the process frequency may be set to a default process frequency (e.g., medium, nominal, normal, neutral, etc.). If the flag of the latch 440 was set, then the process frequency may be adjusted depending on whether the synchronization signal is high or low (and/or depending on whether the synchronization signal has a magnitude that is more or less than a predetermined intermediate magnitude). For example, the first control circuit 400 may decrease the processing frequency in response to the synchronization signal being low and/or increase the processing frequency in response to the synchronization signal being high.

At step 710, the first control circuit 400 may sample the feedback from the sensors 36 (e.g., using ADC 410). At step 712, the first control circuit 400 may use the feedback in conjunction with operator input received via the operator interface 28 to determine a command signal. In some examples, the determination of step 712 may occur via an open control loop, a closed control loop, a waveform generator, and/or some other appropriate mechanism. At step 714, the command signal is output to the PID circuit 302 (potentially after conversion by the DAC 412), and the process 700 then proceeds back to the beginning step 702.

Figure 8:
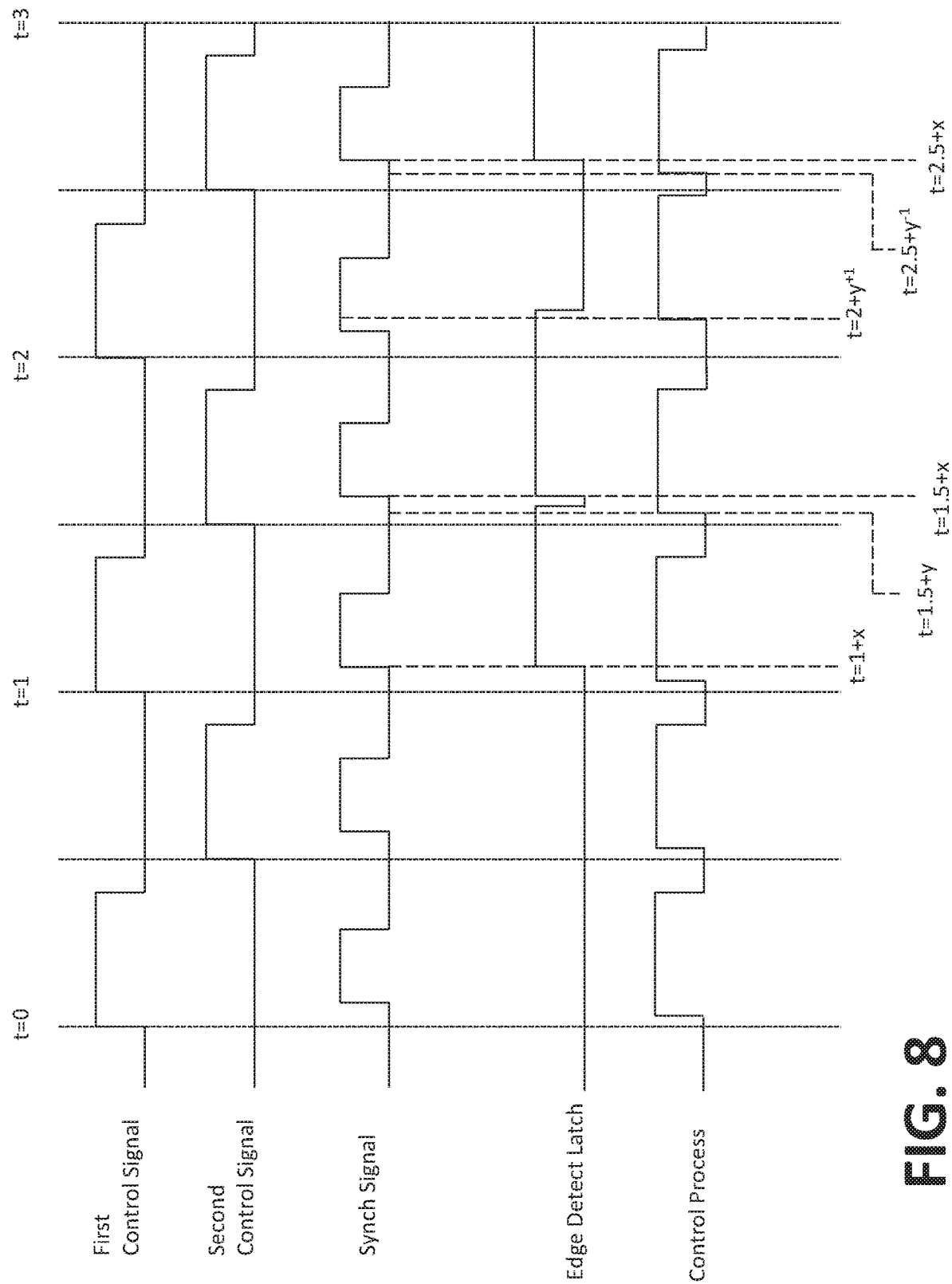
FIG. 8 is a signal diagram illustrating operation of the welding-type power supply of FIG. 3, in accordance with aspects of this disclosure.

FIG. 8 shows a signal diagram illustrating example process frequency adjustment. The signal diagram begins at time t=0, when the duty cycle (e.g., the on, 1, and/or high portion) of the first control signal begins with a rising edge. At time t=0 the second control signal is still low (and/or 0, off, etc.). The second control signal goes high at t=0.5. In the depicted example, the first control signal and second control signal are configured to each go high at separate times, with no overlap (e.g., so as to operate as top and bottom gates in the inverter/converter 324). The first and second control signals each go high for one pulse width (e.g., with one rising edge and one falling edge) over each time period (e.g., between t=0 and t=1, between t=1 and t=2, and/or between t=2 and t=3).

The control process is shown as being a PWM signal in the example of FIG. 8 for illustrative purposes. The rising edge of the control process "signal" is intended to indicate the time when the control process initiates. The times when the control process signal is high is meant to indicate times when the control process is in operation. The low portions of the control process "signal" is meant to indicate times when the control process is inactive and/or waiting to initiate. For the purposes of this example, the edge detector 402 is presumed to have missed detection of the synchronization signal edges in the times between t=0 and t=1 (e.g., due to error, malfunction, distortion, etc.).

In this signal diagram example of FIG. 8, a separate control process initiates for each control signal (first and/or second), and any adjustment to process frequency impacts the next control process initiation, not just the next iteration of that particular control process iteration. Note also that, while the first control signal and second control signal are shown as being relatively constant in the signal diagram in order to keep things simple, in practice the first control signal and/or second control signal may change from cycle to cycle in view of command signals coming from the first control circuit 400. Likewise, while the synchronization signal remains constant in the example of FIG. 8 for simplicity sake, in practice the synchronization signal may change as well (e.g., in examples where the synchronization signal is a modified form of the first and/or second control signal).

In the example of FIG. 8, the control process initiates shortly after t=0 (e.g., at t=y). Following the example process 700, the latch 440 is checked and then reset as one of the first steps of the process 700. However, since the latch 440 was already low (e.g., flag not set), the reset has no visible effect. Because the latch flag was not set, the control process 700 presumes that no edge of the synchronization signal was detected (e.g., due to some error), and thus will not look at the synchronization signal. Rather, the first control circuit 400 will simply set the process frequency to be the default/medium setting (e.g., y), at which the process is already set, so there is no visible change. The rest of the process 700 steps occur, then the control process terminates some time before t=0.5. This allows for some time for a command signal to propagate through the PID circuit 302 to the second control circuit 500 before the next first duty cycle of the first control signal at t=1.

Shortly after t=0.5, the control process will initiate again. Again, the latch 440 is low so the process frequency is set to the medium value, which it was already at, so there is no visible change in operation. Also, the latch 440 is reset, but again, the latch 440 was already low, so there is no visible change. The rest of the process 700 steps will occur, and another command signal will be output from the first control circuit 400 and propagate to the second control circuit 500.

Shortly after t=1, the control process will initiate again. Again, the latch 440 is low so the process frequency is set to the medium value, which it was already at, so there is no visible change in operation. Also, the latch 440 is reset, but again, the latch 440 was already low, so there is no visible change. However, at t=1+x, just after the latch was reset, the edge detector 402 finally detects the rising edge of the synchronization signal, and then sets the flag of the latch 440, resulting in a high level latch 440 for the first time. Nevertheless, since this occurred after initiation of the control process 700, no change in process frequency will occur. The rest of the process 700 steps will occur, and another command signal will be output from the first control circuit 400 and propagate to the second control circuit 500.

At time t=1.5+y, the control process 700 will initiate for the fourth time. This time, the first control circuit 400 will see that the flag of the latch 440 has been set (shown as a high level on the edge detect latch signal). Since the flag of the latch 440 was set, the first control circuit 400 looks at whether the synchronization signal is high or low. Since the synchronization signal is low at t=1.5+y, the first control circuit 400 surmises that it has initiated before the next rising edge of the synchronization signal, and thus decreases the process frequency in an attempt to better align itself with the synchronization signal. Shortly after t=1.5+y, the flag of the latch 440 is reset. However, at t=1.5+x, the edge detector 402 once again detects the rising edge of the synchronization signal, and once again sets the flag of the latch 440.

The process 700 next initiates at t=2+y$^{+1}$, slightly delayed from the last iteration due to the decrease in process frequency. At t=2+y$^{+1}$ the flag of the latch 440 is still set from the prior edge detection at t=1.5+x. Thus, the first control circuit 400 looks at the synchronization signal and sees that the synchronization signal is high. Therefore, the first control circuit 400 surmises that it has initiated after the rising edge of the synchronization signal, and thus increases the process frequency in an attempt to better align itself with the synchronization signal. Shortly after t=2+y$^{+1}$ the latch 440 is once again reset.

The process 700 next initiates at t=2.5+y$^{-1}$, slightly faster than previously due to the increase in process frequency. So much faster that the edge detector 402 has yet to see a rising edge of the synchronization signal, and thus the flag of the latch 440 has not been set. Therefore, the first control circuit 400 sets the process frequency back to the nominal/medium value. The next process initiation (not shown) would occur at t=3+y.

The present methods and systems may be realized in hardware, software, and/or a combination of hardware and software. Example implementations include an application specific integrated circuit and/or a programmable control circuit.

While the present apparatuses, systems, and/or methods have been described with reference to certain implementations, it will be understood by those skilled in the art that various changes may be made and equivalents may be substituted without departing from the scope of the present apparatuses, systems, and/or methods. In addition, many modifications may be made to adapt a particular situation or material to the teachings of the present disclosure without departing from its scope. Therefore, it is intended that the present apparatuses, systems, and/or methods not be limited to the particular implementations disclosed, but that the present apparatuses, systems, and/or methods will include all implementations falling within the scope of the appended claims.

What is claimed is:

1. A welding-type power supply, comprising:
   a first control circuit configured to periodically initiate a process at a process frequency, the first control circuit comprising an edge detection circuit configured to detect one or more of an edge or level of a synchronization signal and set a flag in response to the detection, wherein the process adjusts the process frequency based on the synchronization signal and the flag; and
   a second control circuit configured to generate the synchronization signal.

2. The welding-type power supply of claim 1, further comprising a conversion circuit configured to convert input power to welding-type output power, wherein the second control circuit is further configured to control the conversion circuit using at least a pulse width modulated (PWM) control signal.

3. The welding-type power supply of claim 2, wherein the second control circuit is configured to control the conversion circuit via two or more PWM control signals, and configured to output the synchronization signal as a PWM signal having a phase based on at least one of the two or more PWM control signals.

4. The welding-type power supply of claim 2, wherein the process further determines a command signal based on operator input, and the second control circuit is further configured to control the conversion circuit using at least a pulse width modulated (PWM) control signal, the PWM control signal being based on the command signal.

5. The welding-type power supply of claim 4, wherein the synchronization signal is based on the PWM control signal.

6. The welding-type power supply of claim 4, wherein the first control circuit is configured to measure a feedback signal representative of the welding-type output power, the first control circuit configured to determine the command signal based on the measured feedback signal and the operator input, the operator input comprising at least one of a voltage setpoint and a current setpoint.

7. A welding-type system synchronization method, comprising:
   generating a synchronization signal, via a second control circuit of a welding-type power supply;
   detecting one or more of an edge or level of the synchronization signal, via an edge detection circuit of a first control circuit of the welding-type power supply, and setting a flag in response to the detection; and
   initiating a process according to a process frequency, via the first control circuit, wherein the process adjusts the process frequency based on the synchronization signal and the flag.

8. The method of claim 7, further comprising converting input power to welding-type output power, via a conversion circuit of the welding-type power supply, the conversion circuit controlled by a PWM control signal of the second control circuit, wherein the welding-type output power is used to power a welding-type process.

9. The method of claim 8, wherein the second control circuit is configured to control the conversion circuit via two or more PWM control signals, and configured to generate the synchronization signal as a PWM signal having a phase based on at least one of the two or more PWM control signals.

10. The method of claim 8, wherein the process further determines a command signal based on operator input, via the first control circuit, the second control circuit configured to modify the PWM control signal based on the command signal.

11. The method of claim 10, wherein the process further comprises measuring a feedback signal representative of the welding-type output power, via the first control circuit, the command signal based on the feedback signal and the operator input, the operator input comprising at least one of a voltage setpoint and a current setpoint.

12. A welding-type system, comprising:
   a welding-type power supply, comprising:
      a conversion circuit configured to convert input power to welding-type output power,
      a first control circuit configured to periodically initiate a process at a process frequency, wherein the process adjusts the process frequency based on a synchronization signal; and
      a second control circuit configured to:
         control the conversion circuit using at least two pulse width modulated (PWM) control signals, and
         generate the synchronization signal as a PWM signal having a phase based on at least one of the two or more PWM control signals.

13. The system of claim 12, wherein the first control circuit is further configured to detect one or more of an edge or level of the synchronization signal, the adjustment to the process frequency being based on the detection.

14. The system of claim 12, wherein the first control circuit comprises an edge detection circuit configured to detect one or more of an edge or level of the synchronization signal and to set a flag in response to the detection, the adjustment to the process frequency being based on the synchronization signal and the flag.

* * * * *